United States Patent [19]

Kawabata et al.

[11] Patent Number: 4,521,093
[45] Date of Patent: Jun. 4, 1985

[54] AUTOMATIC FOCUSING DEVICE USED IN COMBINATION WITH AUXILIARY LIGHT SOURCE

[75] Inventors: Takashi Kawabata, Kamakura; Masanori Yamada, Yokosuka, both of Japan

[73] Assignee: Canon Kabushiki Kaisha, Tokyo, Japan

[21] Appl. No.: 573,473

[22] Filed: Jan. 24, 1984

[30] Foreign Application Priority Data

Jan. 26, 1983 [JP] Japan .................................. 58-11051

[51] Int. Cl.³ ........................... G03B 3/00; G03B 7/00
[52] U.S. Cl. .................................... 354/403; 354/415; 354/127.13
[58] Field of Search ............... 354/400, 402, 403, 415, 354/421, 127.13

[56] References Cited

U.S. PATENT DOCUMENTS

| 4,095,241 | 6/1978 | Matsumoto | 354/403 |
| 4,394,077 | 7/1983 | Yoshino et al. | 354/415 |
| 4,459,005 | 7/1984 | Harvey | 354/403 |

*Primary Examiner*—Russell E. Adams
*Attorney, Agent, or Firm*—Fitzpatrick, Cella, Harper & Scinto

[57] ABSTRACT

In a passive type automatic focusing device which cannot detect an in-focus state for a dark object, an auxiliary light source is used. When preparation of light emission of the auxiliary light source is completed, a photo-taking lens driver of the automatic focusing device for the photo-taking lens is activated to drive the photo-taking lens to the in-focus position.

5 Claims, 3 Drawing Figures

4,521,093

AUTOMATIC FOCUSING DEVICE USED IN COMBINATION WITH AUXILIARY LIGHT SOURCE

BACKGROUND OF THE INVENTION

1. Field of the Invention

The present invention relates to an automatic focusing device which illuminates an object by an auxiliary light source to detect a distance to the object and drives a lens to an in-focus position.

2. Description of the Prior Art

In a passive type automatic focusing device which drives a photo-taking lens to an in-focus position by utilizing a light from an object as information on the distance to the object, the device is inoperative when the object is dark. An automatic focusing device which drives the lens to the in-focus position by utilizing an auxiliary light source when the object is dark has been proposed, as shown in U.S. Pat. No. 4,327,976. However, the imaging lens driven by such an automatic focusing device is, in many cases, located at a lens position corresponding to an infinite focusing distance or a lens position corresponding to a minimum focusing distance before it is driven, and a long time is required to drive the lens to the in-focus position. When a TTL auto-focusing operation is carried out in a single lens reflex camera, an image on a finder is extremely defocused when the lens is at the position described above and it is difficult to precisely determine an in-focus position and impossible to frame the image.

SUMMARY OF THE INVENTION

It is an object of the present invention to provide an automatic focusing device which drives a photo-taking lens to a predetermined position before the imaging lens is driven to an in-focus position by illuminating an object by an auxiliary light source when the object is dark, and then emits the auxiliary light to determine the in-focus position.

It is another object of the present invention to provide an automatic focusing device which emits a first auxiliary light before a photo-taking lens is driven to an in-focus position by illuminating an auxiliary light source to an object when the object is dark, detects an intensity of light reflected by the object illuminated by the auxiliary light source, drives the photo-taking lens to a position determined by the intensity of the reflected light, and then emits a second auxiliary light to detect an in-focus position.

DETAILED DESCRIPTION OF THE PREFERRED EMBODIMENTS

Figure 1:
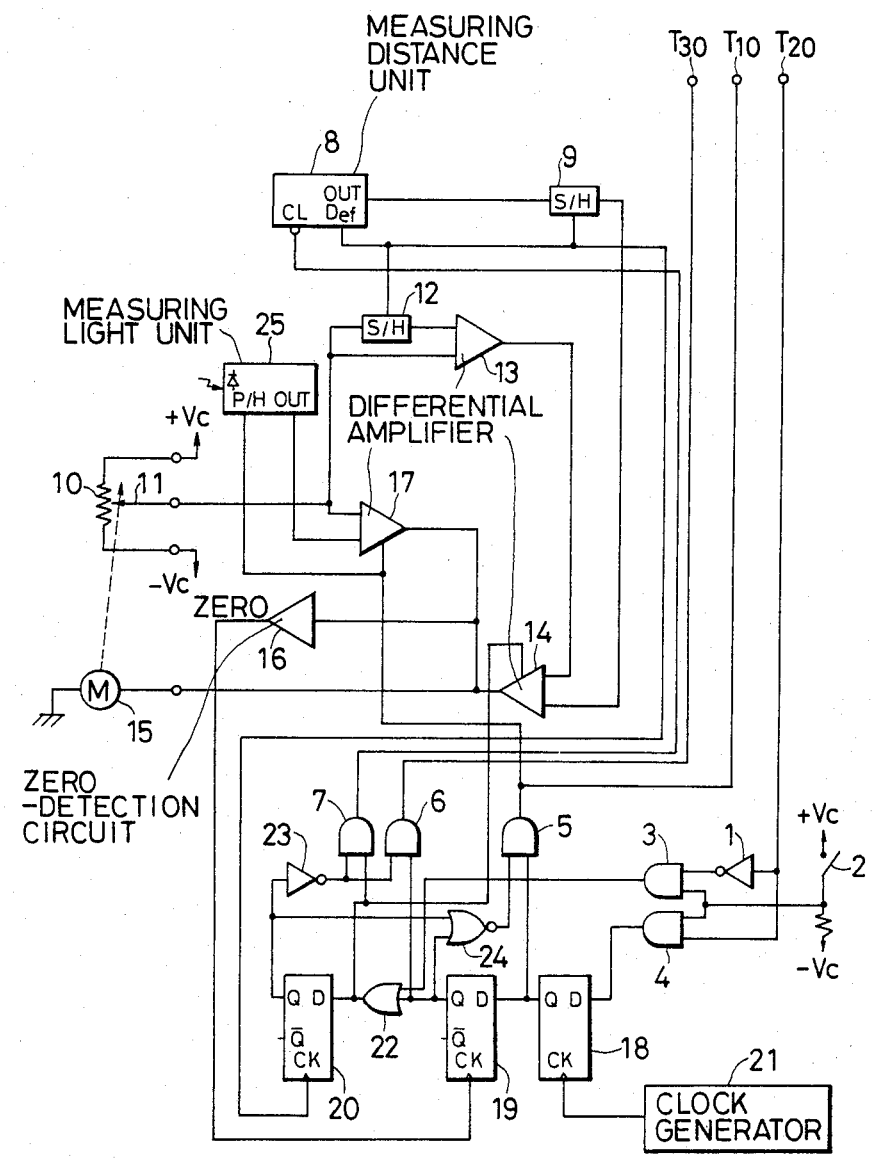
FIG. 1 is a circuit diagram of one embodiment of an automatic focusing device of the present invention, which achieves the second object of the present invention.
Figure 3:
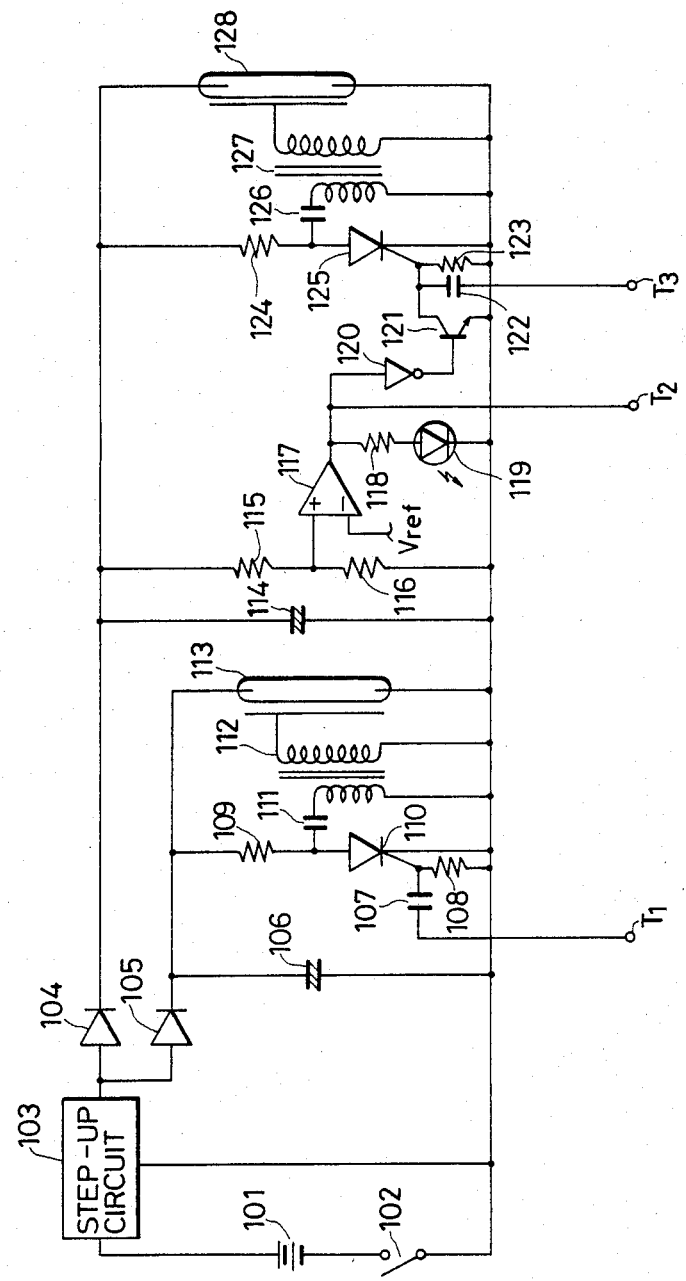
FIG. 3 shows a flash device for emitting an auxiliary light used in combination with the present automatic focusing device.

Referring to FIG. 1, connecting terminals $T_{10}$–$T_{30}$ are connected to connecting terminals $T_1$–$T_3$ of an auxiliary light source shown in FIG. 3. A high level signal is applied to the connecting terminal $T_{20}$ when the auxiliary light source is ready to emit a light. An inverter 1 supplies a high level signal to an AND gate 3 when the auxiliary light source is inoperative, that is, when the connecting terminal $T_{20}$ is at a low level. Numeral 2 denotes an AF switch which is closed during a focusing operation to cause an output of the AND gate 3 or an AND gate 4 to assume a high level depending on a potential at the connecting terminal $T_{20}$, that is, whether it is high level or low level. When an output of an AND gate 5 is high level, it causes the auxiliary light source shown in FIG. 3 to emit a first auxiliary light, and when an output of an AND gate 6 is high level, it causes the auxiliary light source to emit a second auxiliary light. An output terminal of an AND gate 7 is connected to an inverting clean terminal of a distance measurement unit 8. The distance measurement unit 8 is activated in response to the closure of the AF switch 2 and measures a distance under the illumination of the object by the second auxiliary light.

The distance measurement unit is a known passive type distance measurement unit. It is operative when an H-level signal is applied to the clear terminal, and does not produce a signal at terminals Out and Def when an L-level signal is applied to the clear terminal. When a distance data is defined, it produces a pulse at the define signal terminal Def and produces a defocus signal at the output terminal OUT, which is an analog signal representing a quantity of defocus. A sample-hold circuit (S/H) 9 responds to the data define signal from the distance measurement unit 8 to sample and hold the analog signal representing the current quantity of defocus. A sample-hold circuit 12 connected to a movable arm 11 of a potentiometer 10 linked to the photo-taking lens, not shown, samples and holds a position of the photo-taking lens when the data of the distance measurement unit 8 is defined. A differential amplifier 13 produces an output representing a distance of movement of the lens after the data of the distance measurement unit 8 has been defined and supplied the output to a differential amplifier 14. The differential amplifier 14 drives a motor 15 which drives the photo-taking lens, until the quantity of defocus at the output terminal OUT of the distance measurement unit 8 and the distance of movement of the lens at the output of the differential amplifier 13 coincide. A zero detection circuit 16 produces a high level signal when the output of the differential amplifier 14 or a differential amplifier 17 to be described later is zero. The differential amplifiers 14 and 17 are activated only when signals from an OR gate 22 and the AND gate 5, respectively, are high level. Numerals 18–20 denote D-type flip-flops having clock terminals CK thereof connected to a clock generator (CG) 21, the zero detection circuit 16 and the data define signal terminal Def of the distance measurement unit 8, respectively. Numerals 22–24 denote an OR gate, an inverter and a NOR gate, respectively. Numeral 25 denote a light measurement unit which measures a light reflected from the object by a first auxiliary light prior to the focusing operation of the imaging lens, holds a peak of the reflected light during a period in which the AND gate 5 produces the high level output and produces the peak signal at an output terminal OUT, and drives the imaging lens to a position determined by the peak value through the differential amplifier 17 and the motor 15.

The operation of the present embodiment is now explained. The operation when the auxiliary light source is not used, that is, the object is relatively light and the distance measurement unit 8 sufficiently carries out the distance measurement operation is first explained. In this case, since the auxiliary light source is not used, the connecting terminal $T_{20}$ is always at the low level. Accordingly, when the AF switch 2 is closed, the AND gate 3 produces the high level output and the distance measurement unit 8 is activated in response to the closure of the AF switch 2.

The high level output of the AND gate 3 is applied to the D-terminal of the D-type flip-flop 20 through the OR gate 22. At this time, the Q-terminal of the D-type flip-flop is low level and the output of the inverter 23 is high level. As a result, the AND gate 7 produces the high level output, which is applied to the clear terminal $\overline{CL}$ of the distance measurement unit 8. Thus, the distance measurement unit 8 is released from the clear state and starts the distant measurement operation. When the distance data is defined, the distance measurement unit 8 produces a pulse at the distance data define signal terminal Def and the sample-hold circuit 9 samples and holds the quantity of defocus at the timing of the pulse at the terminal Def and the Q-terminal of the D-type flip-flop 20 is reversed from the low level to the high level. As a result, the AND gate 7 produces the low level output and the distance data of the distance measurement unit 8 is cleared. The current position of the photo-taking lens is sampled and held by the sample-hold circuit 12 through the movable arm 11 of the potentiometer at the timing of the sample and hold by the sample-hold circuit 9, and the output of the differential amplifier 13 becomes zero. Since the output of the differential amplifier 13 and the defocus quantity signal from the sample-hold circuit 9 are applied to the differential amplifier 14 which is now activated by the high level output from the OR gate 22, the differential amplifier 14 produces a signal corresponding to a difference between the defocus quantity signal and the output of the differential amplifier 13 and supplies it to the motor 15 as a drive current. As the motor 15 is driven, the photo-taking lens is driven and the movable arm 11 of the potentiometer 10 starts to move. When the output of the differntial amplifier 13 and the defocus quantity signal from the sample-hold circuit 9 coincide, the output of the differential amplifier 14 becomes zero and the drive current to the motor 15 no longer flows. Thus, the motor 15 is stopped and the imaging lens is set at the in-focus position.

The operation when the auxiliary light source is used to illuminate the object is now explained. In this case, the auxiliary light source shown in FIG. 3 is activated and the AF switch 2 is closed while the high level ready for light emission signal is applied to the connecting terminal $T_{20}$. Because the connecting terminal $T_{20}$ is at the high level, the output of the AND gate 4 is high level and the Q-terminal of the D-type flip-flop 18 which is clocked by the clock generator 21 is high level. The D-type flip-flop 18 stores an AF start state. That is, it stores the high level of the Q-terminal in order to assure the sequence even if the AF switch 2 is subsequently opened. Since the D-type flip-flop 19 and 20 now produce the low level outputs, the AND gate 5 supplies the high level output to the connecting terminal $T_{10}$ so that a first light is emitted as will be explained with reference to FIG. 3 and the differential amplifier 17 is activated, A reflection light of the first light is detected by the light measurement unit 25, which holds a peak of the reflected light during a period in which the AND gate 5 produces the high level output, and produces the peak value at the output terminal OUT. Accordingly, the differential amplifier 17 supplies the drive current to the motor 15 until the peak value and the voltage derived by the movable arm 11 of the potentiometer 10 coincide. When the imaging lens is moved to the position determined by the peak of the reflected light of the first light, the output of the differential amplifier 17 becomes zero, which is detected by the zero detection circuit 16 which in turn produces the high level signal. As the output of the differential amplifier 17 becomes zero, the motor 15 is stopped and the photo-taking lens is stopped.

The high level output of the zero detection circuit 16 is applied to the clock terminal CK of the D-type flip-flop 19 so that the Q-output of the D-type flip-flop 19 assumes the high level. The output of the AND gate 5 is reversed to the low level and the outputs of the AND gates 6 and 7 assume the high level. By the high level output of the AND gate 6, the auxiliary light source emits a second light, through the connecting terminal $T_{30}$, and by the high level output of the AND gate 7, the distance measurement unit 8 is released from the clear state and measures the distance under the illumination by the second light. When the distance data is defined, the distance measurement unit 8 produces a pulse at the distance data define signal terminal Def and the imaging lens is rapidly driven to the in-focus position through the same step as described above for the light object.

Figure 2:
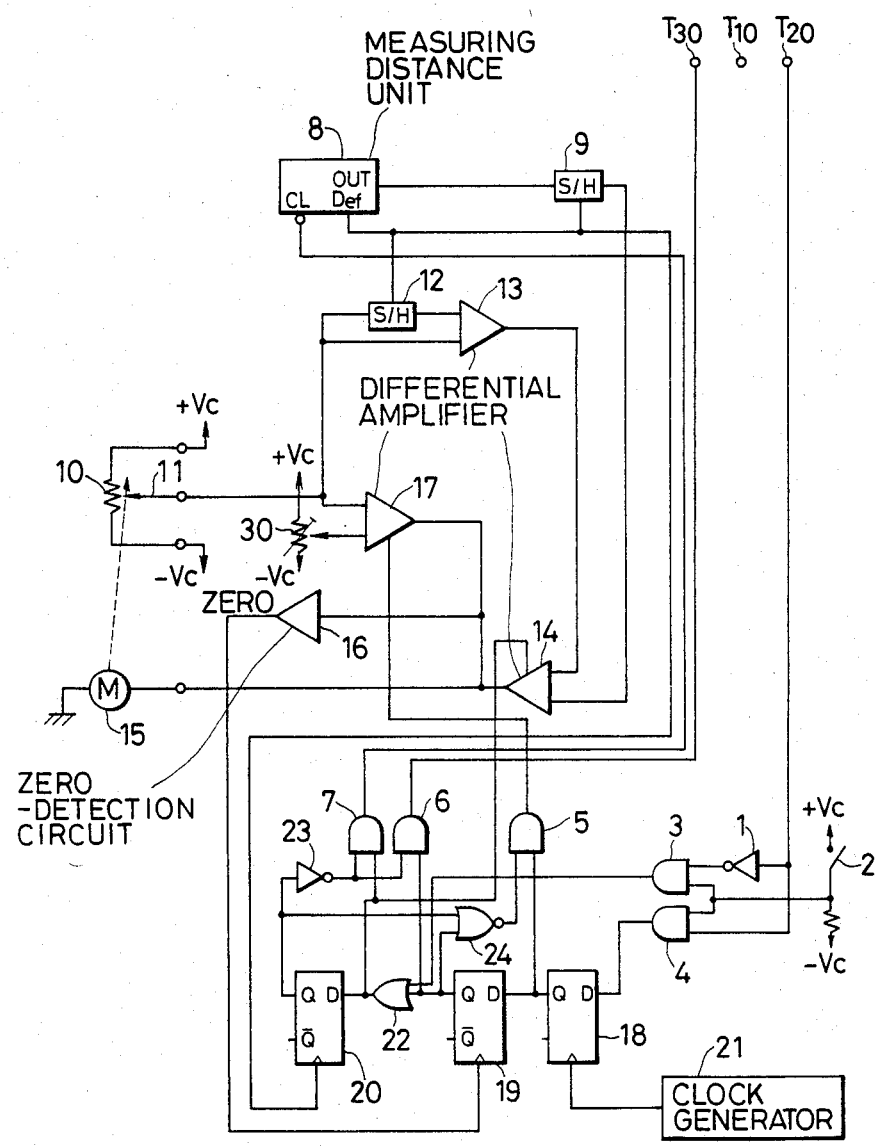
FIG. 2 is a circuit diagram of another embodiment of the automatic focusing device of the present invention, which achieves the first object of the present invention.

FIG. 2 shows a circuit diagram of another embodiment of the automatic focusing device of the present invention. In the present embodiment, prior to the focusing operation, the photo-taking lens is moved to a position at which an object is photographed most probably from a statistics, that is, a usual focusing distance point, or the photo-taking lens is moved to a longest arrival distance point of the auxiliary light, and then the distance to the object is measured under the illumination by the auxiliary light source and the imaging lens is driven to the in-focus position.

In FIG. 2, like elements to those shown in FIG. 1 are designated by like numerals and the explanation thereof is omitted. Unlike the arrangement of FIG. 1, the output of the AND gate 5 is not transmitted to the connecting terminal $T_{10}$ which causes the first light emission but is applied only to a control terminal of the differential amplifier 17. In place of the light measurement unit 25 of FIG. 1, a potentiometer 30 for setting a usual focal point is connected to the input terminal of the differential amplifier.

The operation of the present embodiment is now explained.

When the auxiliary light source is not used, the operation is identical to that of the embodiment of FIG. 1 and hence the explanation thereof is omitted. When the auxiliary light source is used to illuminate the object, the auxiliary light source of FIG. 3 is activated and the AF switch 2 is closed while the light emission ready signal is applied to the connecting terminal $T_{20}$. Because the connecting terminal $T_{20}$ is now at the high level, the output of the AND gate 4 assumes the high level and the Q-terminal of the D-type flip-flop 18 which is clocked by the clock generator 21 assumes the high level. Since the D-type flip-flops 19 and 20 produce the low level outputs, the AND gate 5 supplies the high level output to the control terminal of the differential amplifier 17 to activate it.

A resistance representing the object distance at which the object is photographed most probably from the statistics, that is, the usual focusing distance point is preset in the potentiometer 30. Thus, the differential amplifier 17 supplies a drive current to the motor 15 until the voltage derived by the potentiometer 30 and the voltage derived by the movable arm 11 of the potentiometer 10 representing the current position of the photo-taking lens coincide. When the photo-taking lens is driven to the usual focusing point, the output of the differential amplifier 17 becomes zero, which is detected by the zero detection circuit 16, which in turn produces the high level signal.

By the zero output of the differential amplifier 17, the motor 15 is stopped and the photo-taking lens is also stopped. Thereafter, by the high level output of the zero detection circuit 16, the distance measurement unit 8 measures the distance under the illumination by the auxiliary light source and the imaging lens is rapidly driven from the usual focusing point to an actual in-focus position in the same manner as in the embodiment of FIG. 1.

FIG. 3 is a circuit diagram of an embodiment of the auxiliary light source having the connecting terminals $T_1$, $T_2$ and $T_3$ thereof connected to the connecting terminals $T_{10}$, $T_{20}$ and $T_{30}$, respectively, of FIGS. 1 and 2 in the operating condition.

Numeral 101 denotes a power supply battery which is connected to a known step-up circuit 103 through a power switch 102.

Numerals 106–113 denote a light emitting circuit for emitting a distant measurement auxiliary light or first light. Numeral 106 denotes a light energy storing capacitor connected to a cathode of a rectifying diode 105 connected to the output terminal of the step-up circuit 106, numeral 107 denotes a capacitor connected to a gate of a thyristor 110 of a trigger circuit to be described later, numeral 108 denotes a resistor which constitutes a differentiation circuit with the capacitor 107, numeral 109 denotes a charging resistor connected in series to a trigger capacitor 111, numeral 112 denotes a trigger transformer which constitutes a trigger circuit with the resistor 109 and the capacitors 110 and 111, and numeral 113 denotes a discharge tube having a main electrode thereof connected in parallel to the capacitor 106 and a trigger electrode thereof connected to a secondary winding of the trigger transformer 112.

Numeral 114 denotes a capacitor for storing an object illumination light energy by a second light emission. The capacitor 114 is connected to the output terminal of the step-up circuit 103 through the rectifying diode 104.

Numerals 115–117 denote a circuit for detecting a charge level of the capacitor 114. Numerals 115 and 116 denote voltage dividing resistors connected in parallel to the capacitor 114, and numeral 117 denotes a comparator having a non-inverting input terminal thereof connected to the output terminal of the voltage divider for producing the H-level output when the charge level reaches a voltage level sufficient for the discharge tube 128 to discharge.

A negative input terminal of the comparator 117 is connected to a power supply, not shown, of a reference potential. Numeral 119 denotes a light emitting diode for indicating end of charge, to which a drive voltage is applied through a current limiting resistor 118 when the output level of the comparator 117 is reversed, and numeral 121 denotes an npn transistor connected to the output terminal of the comparator 117 through an inverter 120. An emitter-collector circuit of the transistor 121 is connected in parallel with a resistor 123 to deactivate a thyristor 125 until the charging of the capacitor 114 is completed.

Numeral 122 denotes a capacitor for transmitting a light emission start signal, that is, the high level signal of the AND gate 6 supplied through the connecting terminal $T_{30}$ of FIGS. 1 and 2, to the thyristor 125 through the terminal $T_3$, numeral 124 denotes a charging resistor to a trigger capacitor 126, numeral 127 denotes a trigger transformer which generates a high trigger voltage across a secondary winding when the thyristor 125 conducts, and numeral 128 denotes a discharge tube connected in parallel to second light emission capacitor 114.

The auxiliary light source used in combination with the automatic focusing device of the present invention has thus been described. While it shows the flash device, the auxiliary light source used in the present invention is not limited thereto but an auxiliary light source having a low power light emitting device such as LED or a conventional spot light source may be used.

As described hereinabove, according to the present invention, prior to the focusing operation of the photo-taking lens using the auxiliary light, the lens is driven to the usual focusing point which is statistically determined or the imaging lens is moved to the position determined by the peak value of the reflected light of the auxiliary illumination light measured by the light measurement circuit. Accordingly, the subsequent focusing operation of the imaging lens is rapidly effected and the focusing operation is attained with a smaller error and in a short time. Since the photo-taking lens is almost focused prior to the focusing operation, the framing of the object can be smoothly done.

In the present embodiment, when the AF switch 2 is closed after the detection of the predetermind level of the charge level of the main capacitor of the stroboscope device, the automatic focusing is done by using the auxiliary light. However, the present invention is not limited thereto, and the automatic focusing may be done by using the auxiliary light when the AF switch 2 is closed after the power switch of the stroboscope device was turned on instead of detecting the charge level of the main capacitor of the stroboscope device. To this end, the terminal $T_2$ in the circuit of FIG. 3 is connected to a point which is connected to the power supply when the power switch 102 is turned on.

What we claim is:
1. An automatic focusing device for automatically focusing a photo-taking lens by utilizing an auxiliary light, comprising:
   (a) auxiliary light source for emitting the auxiliary light;
   (b) drive means for moving said photo-taking lens;
   (c) first control means for activating said drive means prior to the activation of said auxiliary light source to move said photo-taking lens to a predetermined position other than a minimum focusing position or an infinite focusing position and then activating said auxiliary light source to emit the auxiliary light;
   (d) focus detection circuit for detecting a focus state of said photo-taking lens by utilizing the auxiliary light of said auxiliary light source; and

(e) second control means for activating said lens drive means on the basis of the focus state detected by said focus detection circuit.

2. An automatic focusing device according to claim 1 wherein said predetermined position of said imaging lens is determined by an object distance at which the object is photographed most probably based on a statistics.

3. An automatic focusing device according to claim 1 wherein said auxiliary light source is flash light source.

4. An automatic focusing device according to claim 1 wherein said lens drive means is a motor for driving said photo-taking lens.

5. An automatic focusing device for automatically focusing a photo-taking lens by utilizing an auxiliary light, comprising:
   (a) auxiliary light source for emitting the auxiliary light;
   (b) lens drive means for moving said photo-taking lens;
   (c) reflection light detection means for detecting a level of reflection light from an object by a first auxiliary light emitted from said auxiliary light source;
   (d) first control means for activating said auxiliary light source to emit said first auxiliary light and moving said photo-taking lens to a position determined by the level of the reflection light detected by said reflection light detection means;
   (e) focus detection circuit for detecting a focus state of said photo-taking lens by utilizing the auxiliary light from said auxiliary light source; and
   (f) second control means for causing said auxiliary light source to emit a second auxiliary light after said photo-taking lens has been moved by said first control means and activating said lens drive means on the basis of the focus state detected by said focus detection circuit.

* * * * *

UNITED STATES PATENT AND TRADEMARK OFFICE
CERTIFICATE OF CORRECTION

PATENT NO. : 4,521,093

DATED : June 4, 1985

INVENTOR(S) : TAKASHI KAWABATA, ET AL.

It is certified that error appears in the above-identified patent and that said Letters Patent is hereby corrected as shown below:

Column 3, line 45, "differntial" should read --differential--;
line 68, after "activated" the "," should read --.--.

Column 6, line 40, "predetermind" should read --predetermined--.

Signed and Sealed this

Fourth Day of February 1986

[SEAL]

Attest:

DONALD J. QUIGG

Attesting Officer

Commissioner of Patents and Trademarks